Dec. 25, 1956 H. W. CAIN 2,775,651

TELEPHONE ANSWERING AND RECORDING DEVICES

Filed April 29, 1953 2 Sheets-Sheet 1

INVENTOR.
HARRY W. CAIN

BY Van Deventer & Shively

ATTORNEYS

TELEPHONE ANSWERING AND RECORDING DEVICES

Filed April 29, 1953 2 Sheets-Sheet 2

INVENTOR.
HARRY W. CAIN
BY Van Deventer & Shively
ATTORNEYS

United States Patent Office 2,775,651
Patented Dec. 25, 1956

2,775,651

TELEPHONE ANSWERING AND RECORDING DEVICES

Harry W. Cain, Meriden, Conn., assignor to Telephone Answering and Recording Corporation, New York, N. Y., a corporation of Delaware Application April 29, 1953, Serial No. 351,804

14 Claims. (Cl. 179—100.1)

The present invention pertains to improvements in telephone answering and recording devices.

An object of the invention is to provide a machine of the above type with improved means for feeding and controlling the recording head and stylus relative to a recording blank thereon.

A further object is to provide means by which the operator is relieved of the necessity for moving the recorder head clear of the record when he desires to play back recordings thereon.

Another object is to provide means of the above nature by which, after the recordings on a partially filled record have been played back, restoration of the device to recording set-up causes the recording stylus to be automatically positioned on the record for utilizing the remainder thereof.

A further object is to provide means by which the recording stylus is brought into contact with the record blank only while the latter is in motion, the movement being mechanically controlled to provide gradual engagement by which possible injury to the recorder or blank is eliminated.

Another object is to provide means of the above type adapted to establish a narrow blank zone between each played-back group of recorded messages and the next succeeding group of recordings, by which means the starting point of each group may readily be located for selective play-back.

A further object is to provide means by which, upon each setting of the device for automatic recording, a single blank starting groove automatically is inscribed on the record blank, thus preventing any possible omission of recorded matter in starting subsequent reproduction.

Other objects and advantages will become evident during the course of the following description in connection with the accompanying drawings, in which.

Figure 1:
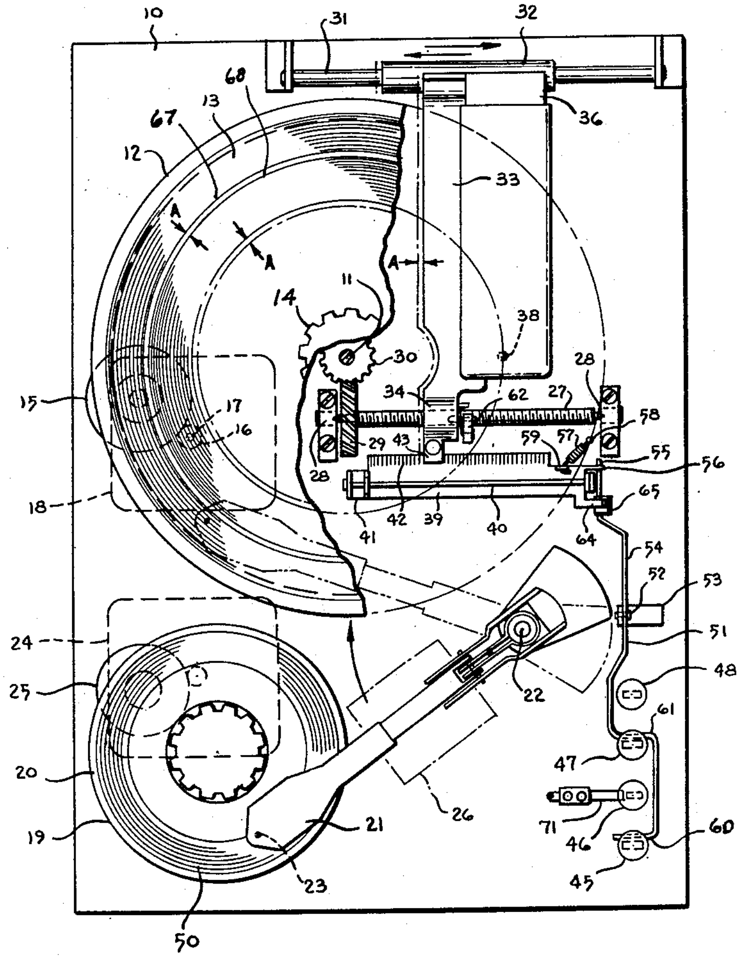
Figure 1 is a plan view of a preferred form of the invention, the turn-table being partially cut away to disclose the feeding mechanism.

Referring to Figure 1, the numeral 10 designates a chassis plate upon which is rotatably mounted a turn-table shaft 11. A main turn-table 12 secured to the top of the shaft 11, is adapted to carry a recording disc 13, a splined hub 14 being provided to assure positive driving of the disc. The turn-table 12 is adapted to be driven via a double-diameter friction roller 15 from a pulley 16 on the vertical shaft 17 of a motor 18 disposed under the chassis plate 10.

A second turn-table 19, of smaller size than the main table 12, is rotatably mounted near the front left corner of the chassis plate 10 and is adapted to carry and drive a small recording disc 20. A pick-up or reproducer 21 is swung on a pivot 22 so located that the pickup needle 23 may be placed in cooperative engagement with recordings either on the small record disc 20, or the main disc 13. The small turn-table 19 is provided with a driving motor 24 and roller 25 similar to those of the large turn-table 12. Cooperation of the pick-up 21 with the small record disk 20 is effected by means of an automatic control mechanism 26 of the general type fully shown and described in co-pending application Serial Number 239,773, filed August 1, 1951, and since the detailed structure and operation of this mechanism do not form per se an essential of the present invention, further description thereof is unnecessary.

A transverse fine-threaded lead screw 27, mounted in pivot bearings 28 on the chassis plate 10, is operatively connected to the main turn-table shaft 11 by means of helical gears 29 and 30.

Figure 3:
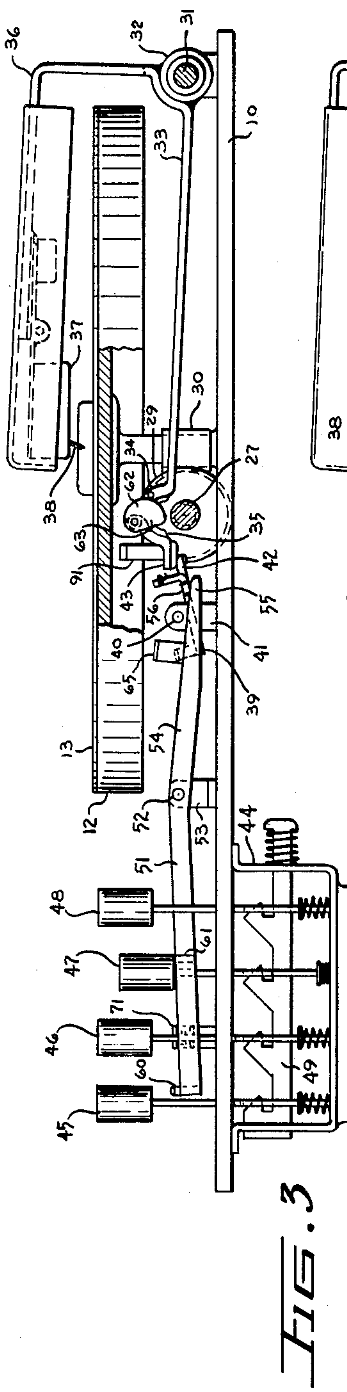
Figure 3 is a side view of the feeding and lift mechanism in elevating position as the play-back switch button is depressed.
Figure 4:
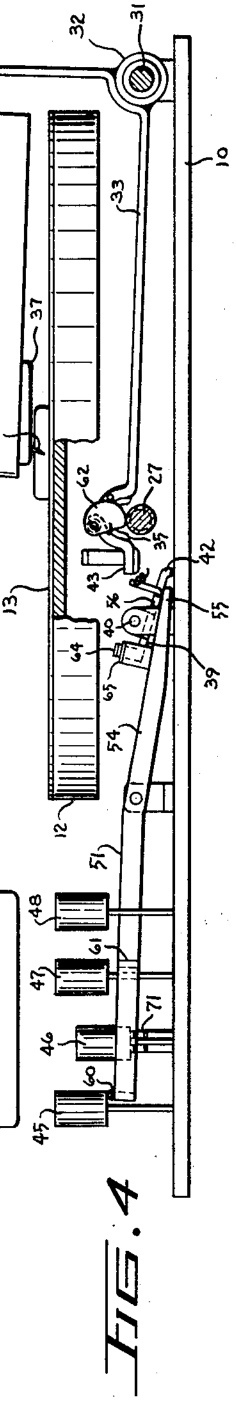
Figure 4 is a similar view of the feeding and lift mechanism with the lowering cam in holding position as the automatic control switch is depressed.

A transverse rear guide rod 31 on the plate 10 has slidably and rockably mounted thereon a carriage 32 having a forwardly extending arm 33. The front end 34 of the arm 33 is shaped in downwardly directed concave form as shown in Figures 3 and 4, and has secured to its lower surface a half-nut 35 of hard felt or the like, adapted to engage the lead screw 27. A second or upper arm 36 of the carriage 32 has rockably secured thereto a recording head 37 overlying the main turntable 12 and having a recording stylus 38 adapted to engage the record disc 13.

A wide rocker 39, Figure 1, is slidably and rockably mounted on a transverse rod 40 retained in a bracket 41 secured to the plate 10 in front of the lead screw 27. The rocker 39 has a rear scored lip 42 underlying a short forward extension 43 of the lower carriage arm 33 throughout the entire extent of the carriage's transverse travel, as hereinafter set forth.

Figure 2:
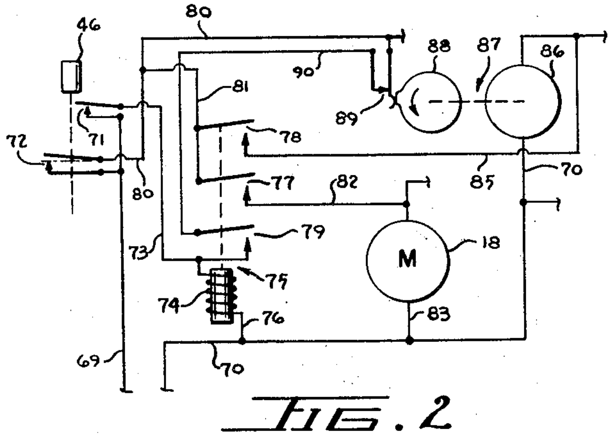
Figure 2 is a schematic electrical diagram of the machine's operational circuits, illustrating in full those portions comprising part of the present invention.

Referring to Figure 3, the numeral 44 generally designates a selective switch assembly adapted to be set in positions to condition the device for the various functions of automatic answering and recording, recording talk-out, playing back received messages, plus the off or disconnected position. Suitable circuits for carrying out the above general functions are shown in copending application Serial Number 30,538, filed June 2, 1948, and since except for the new portion shown in Figure 2, the present invention is directed principally to the mechanical interaction between the switching mechanism and related parts, rather than to circuits per se, only the pertinent electrical details of Figure 2 are included herein.

The switch 44 is comprised of four depressible pushbuttons 45, 46, 47 and 48 equipped with the usual spring-pressed latch bar 49 adapted to release any depressed button as any other button is pressed down to latching position. The first switch button 45, projecting above the right-hand front corner of the chassis plate 10 as shown in Figure 1, is adapted to throw the device's circuits to disconnected position, and accordingly is hereinafter referred to as the "off" button.

Depression of the second button 46 sets the circuits of the machine for automatic answering and recording, as set forth in the above-mentioned co-pending application Serial Number 30,538. Briefly stated, with this setting, ringing current on the connected telephone line initiates a cycle in which the pick-up 21 reproduces over the line a pre-recorded talk-out message 50 from the small record 20. As the talk-out message is completed the motor 18 is energized to drive the large turn-table 12 while at the same time the speech circuits are shifted from reproducing to recording set-up. Thereupon any message coming in over the telephone line is recorded by the stylus 38 on the record disc 13, after which the machine resets to initial condition ready to receive the next incoming call.

The third switch button 47 serves to condition the device for playing back messages received on the large record 13. To carry out this operation the operator depresses the play-back button 47, lifts the pick-up 21 and places it on the large disc 13 in accordance with usual phonograph practice, the recordings being reproduced preferably through the local telephone instrument as described in the above-mentioned co-pending application Serial Number 30,538, or if desired, through a suitable loudspeaker.

The fourth button 48 controls the circuit set-up for local recording of the talk-out message 50 on the small disc 20, this disc having been placed on the large turntable 12 and the recording assembly shifted to proper registry therewith.

Figure 5:
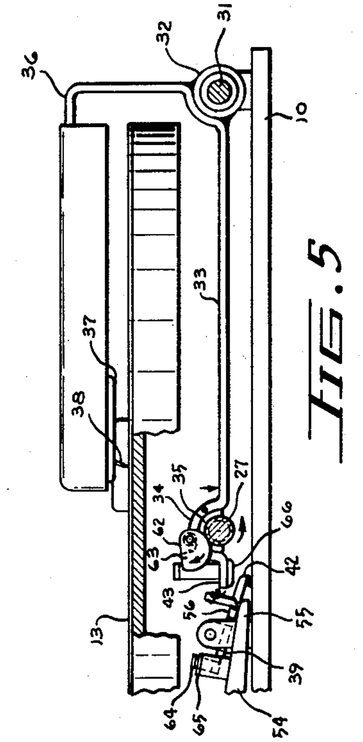
Figure 5 illustrates the operation of the lowering cam.

The numeral 51 generally denotes a lever vertically rockable on a central pivot 52 on a bracket 53 on the right margin of the plate 10. The rear arm 54 of the lever 51 has a tapered toe 55 underlying an outwardly extending tab 56 on the rear portion of the rocker 39 as shown in Figures 1, 3, 4, and 5. A diagonal tension spring 57, stretched between a stationary post 58 and a vertical eye 59 on the rocker 39, Figures 1, 6 and 7, tends to hold the rocker in downwardly rocked position and also in outward sliding position on the rod 40. When the rocker 39 is in this down position it is evident that the tab 56 also holds lever toe 55 in extreme downward position as shown in Figures 4 and 5.

The front arm of the lever 51 is bent laterally at 60 and 61, Figure 1, so as to underlie the edges of the "off" button 45 and the "play-back" button 47. Consequently, when either of these buttons is depressed as shown in Figure 3, it rocks the front arm of the lever 51 downward, thus elevating the rear toe 55 which in turn elevates the rear side of the rocker 39. The serrated edge 42 engages the extension 43 of the recorder carriage arm 33 and moves it upward, raising the recorder head 37 clear of the record 13 and the felt nut 35 clear of the lead screw 27.

A small segmental cam 62 of semi-resilient material is pivotally mounted on the outer edge of the arcuate arm portion 34, and is urged counter-clockwise, Figures 3, 4 and 5, by a very light torsion spring 63. When the recording mechanism is elevated as noted above, the cam 62 swings rearwardly above the screw 27 as shown in Figure 3. The function and further operation of the cam 62 will be set forth hereinafter in connection with the general operational description.

Figure 7:
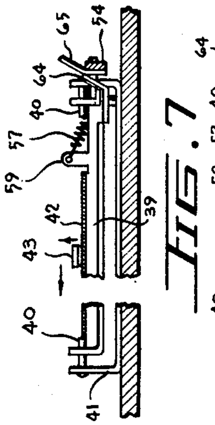
Figure 7 is a similar view with the rocker in raised or engaged position.
Figure 6:
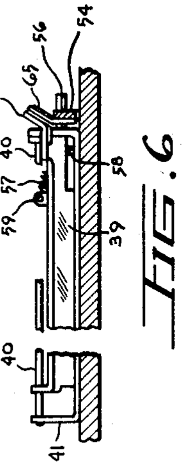
Figure 6 is a fragmental front view of the lifting rocker and shifter guide with the rocker in lower or disengaged position.

The front right corner of the rocker 39 has thereon an upwardly and outwardly inclined shoe 64 adapted to engage a similarly sloped shoe 65 on the rear lever arm 54 as shown in detail in Figures 6 and 7. When the lever arm 54, and consequently the rear side of the rocker 39, are in lowered position as shown in Figure 4, the rocker shoe 64 occupies an elevated position relative to the lowered lever shoe 65 as shown in enlarged detail in Figure 6, allowing the spring 57 to hold the entire rocker unit in its extreme outward or right-hand position. It will be evident, however, that as the lever arm 54 is raised to the position shown in Figure 3, the diagonal engagement between the rising shoe 65 and the falling shoe 64 slides the rocker inward along the rod 40 as illustrated in Figure 7.

The operation of the described recorder-control mechanism in conjunction with the switching means is as follows:

Assuming the machine to be operating in "automatic" set-up, that is answering calls and taking incoming messages in the absence of the operator, the parts are in the relation shown in Figure 5, the recording stylus 38 engaging the record disc 13, and the felt half-nut 35 being held in operative engagement with the lead screw 27 by the preponderance of the weight of the recording carriage arms and attached parts. Each time the motor 18 performs its recording cycle to drive the turn-table 12 as previously noted, the rotating lead screw 27 acting through the half-nut 35, feeds the recording assembly radially inward to generate the spiral recording track in the disc 13.

So long as the device remains in "automatic" setting the stylus 38 remains in engagement with the disc 13, so that the successive recorded messages follow along in a continuous track. However, since any such group of messages recorded during a single absence of the operator may comprise only a fraction of the available recording surface, it is desirable that while a group is being played back the stylus, while disengaged from the record, be maintained in proper radial position to resume subsequent recording without laborious attention by the operator. Furthermore, when two or more groups of recorded messages have been impressed on a single side of a record disc, it is desirable that a narrow dividing zone be provided between successive groups of recordings, in order to facilitate location of the pick-up at the beginning of each group, preventing random re-playing of previously noted messages or omission of new messages. The described apparatus provides the above functions as follows:

When the operator depresses the "play-back" button 47 the latter engages the lateral portion 61 of the lever 51, rocking the front arm thereof downward and elevating the rear arm 54, as shown in Figure 3, the toe 55 in turn actuating the rocker 39 as previously noted. The serrated rear edge 42, engaging the recorder assembly extension 43, first frees the half-nut 35 from the lead-screw 27 and the stylus 38 from the disc 13. During the remainder of the mutual motion of the lever arm 54 and rocker 39 the previously described inter-action of the inclined shoes 64 and 65, Figure 7, moves the rocker a short distance inward. Since the recorder assembly is supported by the rocker, the latter's motion also shifts the assembly inward through a short distance illustrated at A, Figure 1, the recorder being retained in this inner position by the rocker throughout playback. A small shoe 66 of frictional material may be provided on the bottom of the extension 43 to prevent any possible slippage on the serrated edge 42.

Upon completion of play-back, assuming it is desired to re-set the machine for "automatic" answering, depression of the automatic button 46 actuates the latch-bar 49 to release the button 47, allowing the lever 51 and rocker 39 to return to the positions shown in Figures 4 and 6. As previously described, during the elevation of the carriage arm 33 the resilient cam 62 snapped into the position shown in Figure 3. Therefore, as the rocker edge 42 starts downward the cam 62 encounters the lead screw 27 as shown in Figure 4, thereby supporting the recorder mechanism in partly elevated position so that as the rocker is moved downward and outward by the spring 57, Figure 6, the recorder maintains its described inwardly spaced position. Thereafter, as starting of the motor 18 as hereafter set forth causes the lead screw 27 to rotate, the cam 62, which is of semi-resilient frictional material, such as a synthetic rubber composition, is driven forward by the screw as shown in Figure 5 to lower the recording mechanism to engaged position. The contour of the cam 62 is such that the engagement of the stylus 38 with the moving disc 13 takes place slowly enough to prevent injury to either stylus or record disc, the entering end of the recording groove tapering gradually to its full depth.

It will be evident that by the above-described sequence, spacing zones A are provided between the termination of each group recording 67 and the next succeeding group 68 as illustrated in Figure 1.

In automatic message recording the incoming message may normally be started before the completion of the first revolution of the turn-table, especially with long time capacity recording at low record speed. In such a case, if the initial recording groove were to be the first groove of a message group, the pick-up needle could be fed into the groove in such location as to omit the initial words of the recorded message. The present invention is adapted to provide a blank groove at the beginning of each message group to prevent such possible omission, by means illustrated in Figures 2 and 1.

Referring to diagrammatic Figure 2, the numerals 69 and 70 designate the main power supply conductors of the device. A small normally open leaf contactor 71, also illustrated in Figure 1, is so located under the "automatic" button 46 as to be momentarily closed by the terminal over-travel of the button as the latter is manually depressed to latched position. The numeral 72 indicates one of the main switching contactors controllable by the button 46, this contactor being normally open but adapted to be held closed when the button is latched down in operative position.

The momentary closure of the contactor 71 directs current from the conductor 69 via a lead 73 to the magnet coil 74 of a relay 75, thence via return lead 76 to the second conductor 70, thus energizing the relay to close its three normally open contactors 77, 78 and 79.

The contactor 77 completes a current connection from the supply conductor 69 via the switch contactor 72, a conductor 80, branch 81, and lead 82 to the main turn-table motor 18, thence through a return lead 83 to the supply conductor 70. The relay contactor 78 completes a similar connection from branch 81 via a lead 85 to the motor 86 of a re-set type of timer 87, thence to supply conductor 70.

The timer 87 includes a cam 88 which in normal position holds closed a switch 89 connected between the conductor 80 and a wire 90 connected to one side of the relay contactor 79, the other side of contactor 79 being connected to the magnet lead 73. When the relay is actuated by momentary closure of the contact 71 as noted, closure of the contactor 79 completes a holding circuit through the described connections which keeps the relay 75 energized until the switch 89 is allowed to open by rotation of the timer cam 88.

The effect of the above-described apparatus and connections in operation is as follows referring to Fig. 2 for the circuits:

When the "automatic" set-up button 46 is depressed by the operator, the contactor 72 is locked in and the contactor 71 is closed momentarily, thereby closing the relay 75 to start the main motor 18 and timer motor 88. As the motor 18 drives the turn-table 12 and with it the lead screw 27, the cam 65 rolls forward as shown in Figure 5, engaging the half-nut 35 with the lead screw and bringing the stylus 38 gently into grooving engagement with the moving disc 13 as previously explained. The timer cam 88 is so proportioned that it holds the switch 89 closed and hence the motors 18 and 86 in operation until the stylus 38 has traced a complete rotational groove on the record disc. At this point the cam 88 permits the switch 89 to open, breaking the holding circuit of the relay 75, since the momentary closure of the contactor 71 has previously terminated. The relay drops out, de-energizing the motor 18 and timer 87. The timer re-sets to initial position in the usual manner, and the turntable 12 comes to a stop.

From the foregoing description it will be evident that each time the device is set up for automatic operation by depression of the button 46, the recording combination automatically comes into operation to trace a single lead groove on the disc 13, then comes to a stop in position to record subsequent incoming messages, these recordings following in an uninterrupted continuation of the lead groove. Thus when the pickup needle 23 is subsequently fed into the beginning of a group of recordings at any point in the circumference thereof, it first enters the blank lead groove and must traverse the remainder thereof before the first recording comes into registry, so that omission of initial recorded words is rendered impossible. Similarly, as depression of the play-back button 47 always raises the recorder mechanism, it is impossible for the operator to attempt playback with the recorder engaged.

It has been noted that the front transverse portion 60 of the lever 51 underlies the "off" switch button 45. Consequently, depression of this button actuates the lever 51 to disengage the recording mechanism in the same manner as described in connection with operation of the "automatic" switch button 47. By this means, when the machine is not in use the recorder stylus 38 is held out of engagement with the recording medium.

It will further be evident that the automatic spacing of message groups by narrow uniform blank zones prevents either wastage of record space or accidental re-recording in a previously completed groove due to attempted direct manual re-location of the recorder head. Direct handling of the recorder mechanism is thus reduced to a minimum, being required only in recording the small talk-out record 50 or for replacing the main disc 13, for which purpose the upper recorder arm 36 is preferably lifted sufficiently to bring the extension 43 clear of the supporting serrated rocker edge 42 as the carriage is moved laterally. To limit the upward manual moving of the recorder mechanism, a bumper 91, adapted to engage the bottom of the turntable 12, is provided on the lower carriage arm extension 43, Figures 3, 4 and 5.

While the invention has been described in preferred form, it is not limited to the exact embodiment illustrated, as various changes and modifications may be made without departing from the scope of the appended claims.

What is claimed is:

1. In a telephone answering machine, in combination, supporting means, a turn-table rotatably mounted on said supporting means and adapted to hold a recording disc, recording means movably mounted on said supporting means, means on said supporting means to feed said recording means transversely of said disc in recording engagement therewith, means secured to said supporting means to drive said turn-table and said feeding means, means on said supporting means to disengage said recording means from said disc and from said feeding means, means including a switch on said supporting means for conditioning said machine to perform an automatic answering and message recording function, means including a second switch on said supporting means for conditioning said machine to perform a play-back function, inter-locking means operable by each of said switches for releasing the other, and means to operatively connect said second switch with said disengaging means whereby operation of said second switch may actuate said disengaging means.

2. The combination claimed in claim 1, including means on said recording means and operable by said feeding means to guide said recording means slowly into operative engagement with said disk.

3. The combination claimed in claim 1, wherein said first and second switches comprise individual push-buttons, wherein said disengaging means comprises an upwardly rockable member underlying said recording means, and wherein said connecting means comprises a vertically movable lever centrally pivoted to said supporting means, said lever having a forward arm underlying said second switch button and a rear arm underlying said rockable member.

4. The combination claimed in claim 1, including a third switch and means controlled thereby for disabling the operating circuits of said machine, said third switch being operatively connected to said inter-locking means whereby operation of any one of said three switches may release any previously set one of said other switches, and wherein said connecting means extends into cooperative relation with said third switch for operation thereby to actuate said disengaging means.

5. The combination claimed in claim 1, wherein said driving means comprises an electric motor and including means to connect said motor electrically to a source of current, an auxiliary contactor on said support and operable by said first switch to actuate said electrical connecting means for energizing said motor whereby said motor may drive said turn-table and feeding means, and timing means to release said electrical connecting means upon completion of a pre-determined rotational motion of said turn-table.

6. The combination claimed in claim 1, including means on said disengaging means to shift said recording means a predetermined distance transversely respecting said turntable when said disengaging means is actuated.

7. The combination claimed in claim 1, wherein said disengaging means comprises a transversely pivoted rocker bracketed to said supporting means and having a lifting edge underlying a portion of said recording means throughout the extent of lateral travel of said recording means, an inclined shoe on said rocker, and a second inclined shoe on said connecting means and adapted to engage said first shoe, said shoes being cooperative to shift said rocker laterally when said rocker is actuated by said connecting means.

8. In a telephone answering and recording machine in combination, supporting means, a member movably mounted on said supporting means and adapted to hold a recording medium, means on said supporting means to record messages in connected spiral grooves on said recording medium, control means on said supporting means and including a switch settable to condition said machine for automatically actuating said recording means to record said messages, and auxiliary actuating means operatively connected to said switch and including time-limiting means, said auxiliary actuating means being controllable by said setting of said switch to actuate said recording means throughout a predetermined length of time whereby a blank groove may be generated on said medium comprising a guard groove for connection to the first of said spiral recording grooves.

9. The combination claimed in claim 8, including means on said supporting means in cooperative relation with said recording medium for playing back said recorded messages, means on said supporting means including second switching means settable to condition said machine for playing back said messages, and means on said supporting means in operative relation with said second switching means and operable thereby to disengage said recording means from said medium and to shift said recording means a predetermined distance laterally with respect to said medium.

10. In a telephone recording device, in combination, supporting means, a member rotatably mounted on said supporting means and adapted to hold a recording medium, means on said support to effect successive message recordings on said medium, motor means on said supporting means operatively connected to said rotatable member and said recording means for driving the same, switching means settable for conditioning said device for automatically effecting said message recordings, a pair of current supply conductors, a relay having an actuating coil electrically connected on one side to one of said supply conductors, a normally open auxiliary contactor electrically connected in series between the other side of said coil and said second supply conductor, said auxiliary contactor being associated with said switching means for momentary closure thereby as said switching means is set whereby said relay may be actuated, an electrically operable timer, means including contact-making means on said relay to establish operative circuits for said motor and timer between said supply conductors when said relay is actuated, and means including in series a normally closed contact on said timer and a normally open contact on said relay for establishing a holding connection from said second supply conductor to said other side of said relay coil when said relay is actuated, said timer including means to release said normally closed contact after a predetermined rotational operation of said rotatable member.

11. In a telephone answering and message recording machine, in combination, a support, a member rotatably mounted on said support and adapted to hold a recording medium for receiving said messages, a feed screw rotatably mounted on said support, a motor operatively connected to said rotatable member and feed screw, a recorder carriage slidably and rockably mounted on said support, a recorder head on said carriage and adapted to traverse said recording medium, an arcuate partial nut on said carriage normally engaging said feed screw in driving relation, means on said support to elevate said carriage to disengage said nut from said feed screw and said recorder head from said medium, and means to hold said carriage elevated when said elevating means is withdrawn, said holding means engaging said feed screw and being adapted to be retracted thereby when said screw is driven by said motor, whereby said carriage may be lowered to engaged position.

12. The combination claimed in claim 11, wherein said holding means comprises a cam pivotally mounted on said carriage and adapted to swing above said screw when said carriage is elevated.

13. The combination claimed in claim 11, wherein said holding means comprises a cam of frictional material pivotally mounted on said carriage above said screw and resilient means to swing said cam into holding position above said screw, said cam having a periphery adapted to engage said screw in a zone of radially decreasing extent as said moving screw rolls said cam out of said holding position, whereby said carriage may be lowered to engaged position at retarded speed.

14. The combination claimed in claim 11, including means to reproduce said recorded messages, a push-button switch on said support settable to condition said device for said reproduction, a second push-button switch on said support settable for electrically disabling said device, and common means on said support and operable by either of said switches for actuating said elevating means.

No references cited.